United States Patent
Moe et al.

(10) Patent No.: US 8,996,020 B2
(45) Date of Patent: Mar. 31, 2015

(54) METHOD OF BRINGING A WIRELESS TELECOMMUNICATION CELL INTO DTX MODE

(75) Inventors: Johan Moe, Mantorp (SE); Mehdi Amirijoo, Linköping (SE); Pål Frenger, Linköping (SE); József Barta, Budapest (HU); András Veres, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 211 days.

(21) Appl. No.: 13/574,768

(22) PCT Filed: Jan. 25, 2010

(86) PCT No.: PCT/SE2010/050065
§ 371 (c)(1),
(2), (4) Date: Jul. 23, 2012

(87) PCT Pub. No.: WO2011/090412
PCT Pub. Date: Jul. 28, 2011

(65) Prior Publication Data
US 2012/0295631 A1 Nov. 22, 2012

(51) Int. Cl.
*H04W 72/00* (2009.01)
*H04W 52/02* (2009.01)
(Continued)

(52) U.S. Cl.
CPC .......... *H04W 24/02* (2013.01); *H04W 52/0216* (2013.01); *H04W 88/08* (2013.01); *H04W 52/0206* (2013.01); *Y02B 60/50* (2013.01)
USPC ........... 455/450; 455/574; 455/436; 455/453; 370/311; 370/338

(58) Field of Classification Search
CPC ............ H04W 24/02; H04W 52/0206; H04W 52/0216; H04W 88/08; H04W 56/0005
USPC ........ 455/452.1, 550.1, 436, 522, 458, 435.2, 455/423; 370/331–338
See application file for complete search history.

(56) References Cited

U.S. PATENT DOCUMENTS 6,493,334 B1 * 12/2002 Krzymien et al. ............ 370/342
7,796,568 B2 * 9/2010 Tynderfeldt et al. .......... 370/337
(Continued)

FOREIGN PATENT DOCUMENTS

| | | |
|---|---|---|
| EP | 1611758 B1 | 5/2008 |
| EP | 2056628 A1 | 5/2009 |

(Continued)

OTHER PUBLICATIONS

Sheng et al. (Green Mobile Access Network with Dynamic Base Station Energy Saving; MobiCom'09, Sep. 20-25, 2009, Beijing, China).*

(Continued)

*Primary Examiner* — Sharad Rampuria
(74) *Attorney, Agent, or Firm* — Coats & Bennett, P.L.L.C.

(57) ABSTRACT

In a method and system for automatically bringing a cell into DTX mode, a time period is introduced during which the outcome of bringing a cell into DTX mode is observed. The cell can return to a transmission mode if the outcome is non-satisfactory as determined by some criteria. Hereby an improved automated DTX method can be implemented which helps save energy in a cellular radio system.

14 Claims, 3 Drawing Sheets

(51) Int. Cl.
*H04W 24/02* (2009.01)
*H04W 88/08* (2009.01)

(56) References Cited

U.S. PATENT DOCUMENTS

| | | | |
|---|---|---|---|
| 8,400,934 B2* | 3/2013 | DiGirolamo et al. | 370/252 |
| 2003/0060244 A1* | 3/2003 | Ruohonen | 455/574 |
| 2013/0210447 A1* | 8/2013 | Moe et al. | 455/453 |

FOREIGN PATENT DOCUMENTS

| | | |
|---|---|---|
| WO | 0207464 A1 | 1/2002 |
| WO | 2009115554 A1 | 9/2009 |

OTHER PUBLICATIONS

Marsan, M.A., et al., "Optimal Energy Savings in Cellular Access Networks." Communications Workshops 2009. ICC Workshops 2009, IEEE International Conference on. Jun. 14-18, 2009.

Chiaraviglio, L., et al., "Energy-Aware UMTS Access Networks: The 11th International Symposium on Wireless Personal Multimedia Communications (WPMC '08)." Jun. 24, 2008.

3rd Generation Partnership Project, "LTE energy saving solution proposal to cell switch off/on." 3GPP TSG-RAN WG3 #66bis. R3-100163. Jan. 18-22, 2010. Valencia, Spain.

Zhou, S., et al., "Green Mobile Access Network with Dynamic Base Station Energy Saving." National Lab for Information Science and Technology, Tsinghua University, China. Hitachi Research & Development Corporation (China); MobiCom '09. Sep. 20-25, 2009, Beijing, China.

3GPP. "Technical Specification Group Services and System Aspects; Telecommunication management; Study on Management of Evolved Universal Terrestrial Radio Access Network (E-UTRAN) and Evolved Packet Core (EPC) (Release 8)." 3GPP TR 32.816 V2.0.0. Nov. 2008. 3GPP, Sophia Antipolis, France.

Ericsson. "Technical Specification Group Services and System Aspects Meeting #42, Dec. 8-11, 2008, Athens, Greece; Presentation of Specification to TSG SA Meeting #42; Document for presentation: TR 32.816 Version 2.0.0." S5-082394. Dec. 2008. 3GPP, Sophia Antipolis, France.

NGMN Project 12. "Annex A (informative) of 'Use Cases related to Self Organising Network. Overall Description.' Informative List of SON Use Cases." Apr. 17, 2007. NGMN, Frankfurt, Germany.

* cited by examiner

METHOD OF BRINGING A WIRELESS TELECOMMUNICATION CELL INTO DTX MODE

TECHNICAL FIELD

The present invention relates to a method and a device for automatically bringing a cell in a cellular radio system into a Discontinuous Transmission (DTX) mode.

BACKGROUND

Energy efficiency is an important aspect of wireless telecommunication systems. There are many solutions, and they are found in protocols, algorithms and hardware etc. Normally traffic load in the radio network varies; resource utilization is fluctuating between night (normally low) and day (normally high); in night time the spare capacity is running unutilized in the radio network. One approach is to halt partial radio resources during low traffic hours such as between 22.00 and 04.00.

However, legacy wireless telecommunication systems are not built specifically with energy efficiency in mind so solutions are often gross grained. For example it may only be possible to stop a complete cell from transmitting and receiving (discontinuous transmission). Using this approach may result in loss of coverage because capacity is lost since the cell is taken down. As a result it must first be verified that there is radio coverage in the area served also after stopping cell transmission.

Hence, there exists a need for a method and a system for taking a cell or a site into discontinuous transmission (sleep mode) without risking the coverage of its users, i.e. active or idling User Equipments (UEs).

SUMMARY

It is an object of the present invention to overcome or at least reduce some of the problems associated with the above.

It is another object of the present invention to provide a method and a device that is capable bringing a cell into discontinuous transmission mode with little or no risk that coverage and/or service levels are jeopardized.

At least one of the above objects is obtained by the method and system as set out in the appended claims. Thus, by introducing a time period during which the outcome of bringing a cell into DTX mode is observed and letting the cell return to a transmission mode if the outcome is non-satisfactory as determined by some criteria, an improved automated DTX method can be implemented which helps save energy in a cellular radio system.

In accordance with one embodiment an automated method of bringing a cell in a cellular radio network into DTX mode is provided. The method can comprise the following steps:
  determining coverage requirements of a geographical area covered by the cellular radio network,
  selecting at least one cell in the cellular radio network to bring into DTX mode,
  moving the selected cell(s) into DTX mode,
  observing during a non-zero time period the outcome of the moving of the at least one cell into DTX mode, and
  determining if a particular cell of the at least one cell(s) is to remain in DTX mode or if the particular cell is to return to a transmission mode based on the observations during the non-zero time period.

In accordance with one embodiment a cell is returned to a transmission mode if a predetermined number of active User Equipments of that cell have not moved to another cell during the non-zero time period.

In accordance with one embodiment a cell is returned to a transmission mode if a predetermined number of idle User Equipments of that cell have not made a cell reselection during the non-zero time period.

In accordance with one embodiment information received from User Equipments is used for determining if a particular cell of the at least one cell(s) is to remain in DTX mode or if the particular cell is to return to a transmission mode based on the observations during the non-zero time period.

In accordance with one embodiment neighbor cells are informed that a cell is selected to be brought into DTX mode.

In accordance with one embodiment the strength of a transmission signal of the cell is reduced during the non-zero time period.

In accordance with one embodiment the transmission signal is a pilot signal.

In accordance with one embodiment a cell is determined to return to a transmission mode if during the non-zero time period a neighboring cell of that cell experiences a load above a predetermined threshold.

In accordance with one embodiment the method comprises reporting an event where a cell selected to be brought into DTX mode is determined to be returned to a transmission mode based on the observations during the non-zero time period to at least one other entity of the cellular radio network.

In accordance with one embodiment the at least one other entity is one or many of a Domain manager or a calculation unit.

The invention also extends to a controller device for implementing the procedures above. In particular the controller device can be implemented using software stored in a memory that when executed by a processor of the device causes the device to perform the steps described above.

BRIEF DESCRIPTION OF THE DRAWINGS

The present invention will now be described in more detail by way of non-limiting examples and with reference to the accompanying drawings, in which.

DETAILED DESCRIPTION

In accordance with the invention coverage requirements information is determined. The determined coverage requirements can also consider the relevant radio access technologies present in an area for which the coverage is determined. Such information describes for a specific first cell the set of second cells that provide coverage over the entire service area of the first cell. It is also possible to consider partial coverage to some percentage over the service area. The coverage requirements information can for example be determined as described in the international patent application no PCT/SE2009/051008.

This information can for example be stored in a data base as a coverage requirement matrix comprising all cells that can be in sleep mode for all considered cells. Below an exemplary matrix is shown.

| D | [1 | 1 | 0 | 0] |
|---|---|---|---|---|
|   | A | B | C | D |

In the above exemplary matrix case only cell D can be in sleep mode. The corresponding row indicates the other cells that need to be in active mode in order to allow cell D to be in sleep mode without jeopardizing the coverage. In this example cells A and B need to be active in order for cell D to be able to go to sleep mode without risking losing coverage.

One exemplary procedure for generating the coverage requirements information is based on path gain or received signal strength information over the service area, possibly reported by localized mobiles or prepared in a cell planning tool. The information can be separated in uplink and downlink coverage. If the first cell service area can be covered by a set of second cells at some percentage level, then the service area can be covered even though the first cell is in sleep mode.

In accordance with the invention a selection of discontinuous transmission (DTX) cells can be determined, considering the relevant radio access technologies. In accordance with one embodiment an optimal selection of DTX cells is determined. Such a selection describes for a specific network deployment the set of cells that can be put to discontinuous transmission (DTX) while the remaining ones are in operation without risking not fulfilling coverage and capacity requirements. By activating DTX for all or a subset of the selected cells, the network may save energy while fulfilling coverage and a minimum of capacity.

Figure 1:
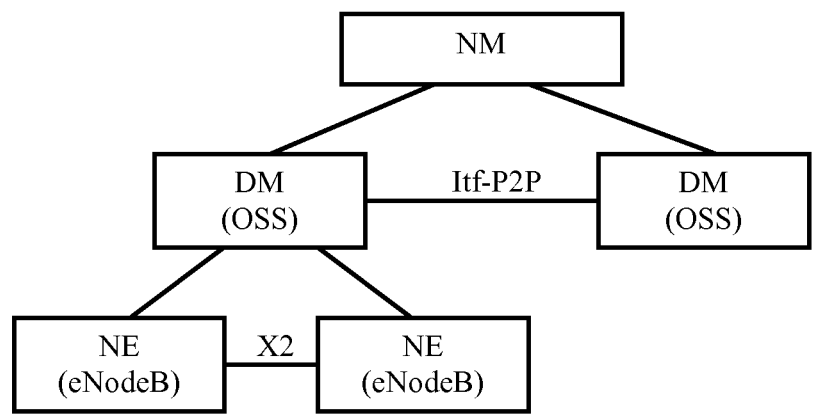
FIG. 1 is a view illustrating a cellular radio system management architecture.

In FIG. 1 an exemplary cellular radio system with a management system is depicted. The node elements (NE), also referred to as radio base stations eNodeBs, are managed by a domain manager (DM), also referred to as the operation and support system (OSS). A DM may further be managed by a network manager (NM). Two NEs are interfaced by an X2 interface, whereas the interface between two DMs is referred to as an Itf-P2P interface.

Since the selection of potential DTX cells partly is based on measurement collections and estimations an additional step is beneficial to validate the outcome of a DTX activation for a particular cell or a set of cells. This is so because it can be the case that the actual load and/or energy consumption in the end in remaining cells is higher than estimated which would jeopardize the coverage or capacity of the system if one or many cells are put in DTX mode. It can also be that idle UEs lose coverage since they are not represented by the active UEs. These factors may be compensated for by applying safety margins, but there still remains a risk that an estimate may (partly) fail.

In accordance with one embodiment a time period during which a cell (or site) is gracefully, i.e. during a non-zero time period, automatically moved into DTX mode is provided. The time period can be set either dynamically or be a preset time period. During the time period all UEs served in the area and related cells can be observed to verify the real outcome of the DTX activation. Based on the observations during the time period, the cell (site) is then placed in a DTX mode or the operation is aborted.

Figure 2:
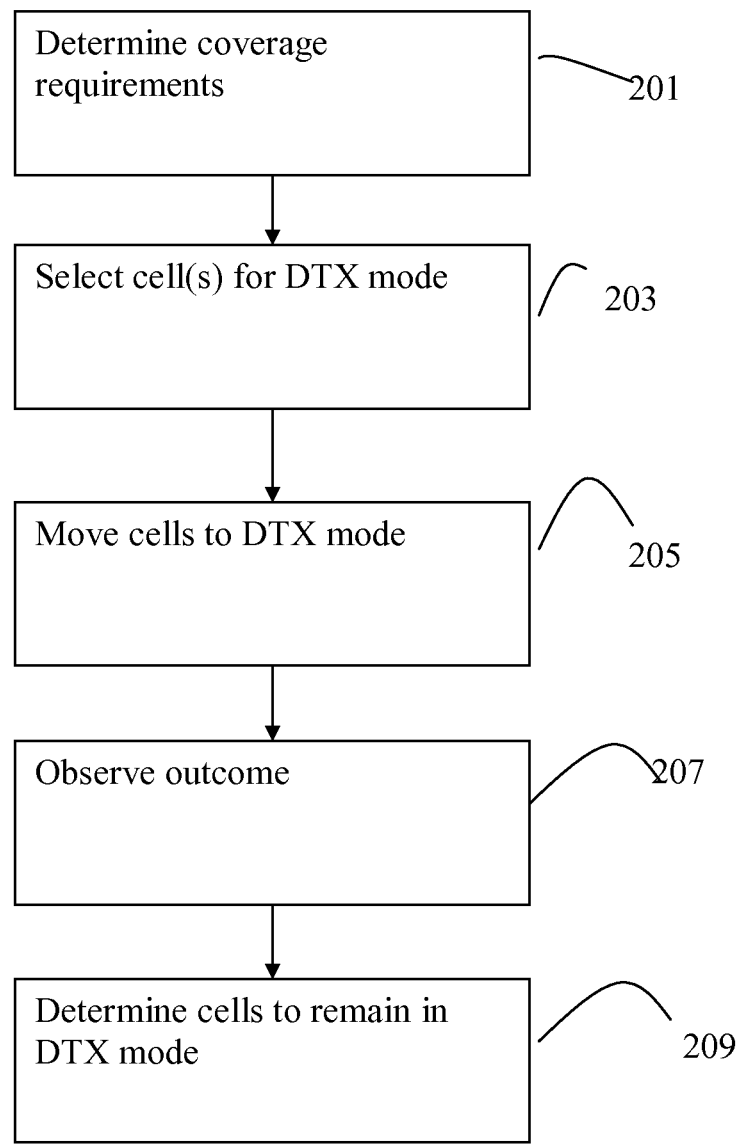
FIG. 2 is a flow chart illustrating some procedural steps performed when bringing a cell into DTX mode.

In FIG. 2 a flow chart illustrating some procedural steps when automatically bringing one or many cells (sites) into DTX mode is depicted. First in a step 201 coverage requirements of the geographical area in which the cells (sites) are going to be placed in DTX mode is determined. Next, in a step 203 at least one cell (site) is selected to be automatically placed in DTX mode. In particular an optimal set of cells (sites) in the geographical area minimizing the power required to meet the coverage requirements determined in step 201 and any other requirements that may be in force within the geographical area. Such other requirements can for example be service level requirements or capacity requirements. Thereupon, in a step 205, the selected cell(s) are automatically moved into DTX mode. During a time period following the time when the selected cells were moved into DTX mode the UEs served in the area affected by the moving of cells to DTX mode are observed in a step 207. Then, based on the observations in step 207, it is determined in a step 209 if a particular cell of the selected cell(s) is to continue in DTX mode or if the particular cell of the selected cell(s) is to return to an active transmission mode. In other words in step 209 it is determined which cells are to continue in DTX mode and which to bring back to a transmission mode.

In accordance with one embodiment the cell moving into DTX mode can be configured to reduce a transmission signal such as a pilot signal (or equivalent) by reducing the signal strength during the time period. In accordance with one embodiment the signal strength is reduced in iterative steps, while UEs are handed over to neighbor cells.

If a UE is in idle mode, cells can be reselected for such UEs in idle mode.

If during such a time period when the cell is moving into a DTX mode, it is noted that a number, in particular at least one, of the UEs of the cell moving into DTX mode face unacceptable coverage or a second cell suffer from all too high load (for example by having to serve to many UEs) the whole process can be aborted and the cell can be moved back to a normal transmission mode. Such an abort event can be reported back to possible DM (operator) and calculation units (coverage estimator, energy optimizers).

Figure 3:
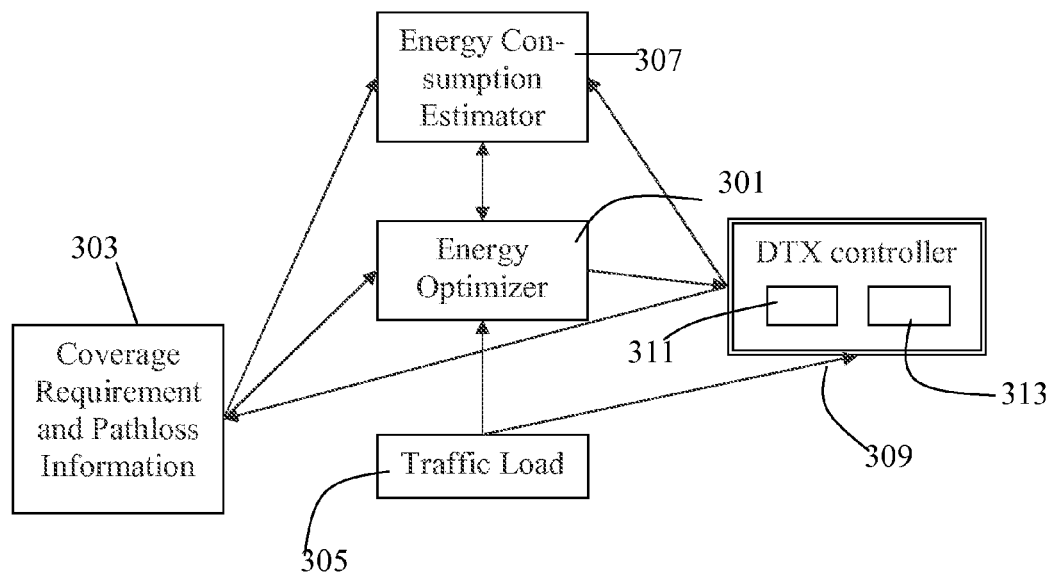
FIG. 3 is a view of an arrangement used for bringing a cell into DTX mode.

In FIG. 3, a logical overview of different entities and information signaling within a system of such entities when determining to put a cell in DTX mode in accordance with the processes as described herein is depicted.

FIG. 3 depicts an energy optimizer 301 which typically can be implemented using a micro controller operating on a set of software instructions stored in a memory of the energy optimizer 301. The energy optimizer can be located in any suitable network node of a radio system such as in a network element or a domain manager or any other suitable node of a radio system such as a radio system depicted in FIG. 1. The energy optimizer 301 receives information from a Coverage Requirement and Pathloss Information database 303, a traffic load estimator 305 and a energy consumption estimator 307. The Coverage Requirement and Pathloss Information database 303 typically provides an up to date view of the current requirements that the radio network needs to fulfill at any given time. The traffic load estimator 305 generates an estimation of the current traffic load for the entire or a subsection of the radio system. In particular the traffic load is estimated per cell (or site). The energy consumption estimator 307 provides an estimation of the power consumption within the radio system and in particular the power consumption for each cell (or site). Based on the information from the entities 303, 305 and 307, the energy optimizer calculates an output indicating the optimal set of cells that should be active to optimize (minimize) the power consumption within the network and at the same time maintain service levels. The output is provided to a DTX mode controller 309 which in turn selects a number of cells (sites) to be put in DTX mode based on the received result from the energy optimizer 301. The DTX mode controller can for example be implemented using a micro controller or micro processor 311 operating on a set of computer program instructions stored in a memory 313. The computer program instructions can for example be such as to cause the microcontroller to execute one or many of the steps described above in conjunction with FIG. 2. The DTX mode controller can further be configured to let the selected cells enter a DTX mode using any of the procedures as described herein, e.g. using software implementing any of the procedures as described herein.

All calculation units in the system as described herein such as the units 301, 305 and 307 of the system can learn from experience and compensate the algorithms by receiving feedback from the DTX mode controller 309. Using the procedure comprising a non-zero time period when a cell is gradually moved into DTX mode, the whole system can save energy while not risking the coverage of active or idle UEs.

Using a DTX mode controller 309 adapted to perform activation of DTX in all cells using a non-zero time period when a cell is gradually moved into DTX mode can be achieved in different ways. In accordance with one embodiment the DTX mode controller 309 collects information such as load from the cells, plus information from the optimiser what cells to set in DTX. Finally the DTX mode controller 309 can provide feedback information to the coverage and energy consumption estimators. An indication to management systems is not indicated in FIG. 3 but is also envisaged and possible.

The network deployment can consist of a multitude of radio access technologies such as global system for mobile communication (GSM), Wideband Code Division Multiple Access (WCDMA), Long-Term Evolution (LTE) etc. and possible multiple carriers. The DTX mode controller can be triggered to be activated on an activation signal from an Energy Optimizer 301 from which it receives a number of cells (sites). In accordance with one embodiment the signal is associated with a list of cells (sites to be put in DTX mode). The list can typically consist of the cells that shall be taken to DTX and the cells possibly affected.

In accordance with one embodiment, the neighbors of the cell being targeted for DTX are informed that the cell is now going into DTX. As a result they are then not allowed to hand over users back to the cell going into DTX. An exception to this procedure can be set to when there are no other possibilities. In practice this means that a user (UE) must see the DTX cell as the only candidate for service—the alternative would be a radio link failure (RLF).

Moving users to other Radio Access Technologies (RATs) can be set to take place automatically. If there is no intra RAT neighbor then users may find inter RAT neighbors and move there. An alternative independent of intra RAT handling is the following. In the DTX cell the priority is lowered so that the other carriers or access technologies are now higher priorities than the own carrier. This has the consequence that UEs are now asked to scan the radio interface and report Inter Radio Access Technologies (IRAT) candidates. As a result, once an appropriate candidate cell is found a UE (user) is handed over to that candidate cell.

If the load in the neighbors increases too much or if some users are handed over from the neighbors to the DTX cell the DTX activation can be aborted.

For the intra RAT scenario, it will be hard, if not impossible, to hand-over all users in the DTX cell to neighbors due to interference from the own cell, since users in the center of the first cell normally have difficulties decoding control channels of the neighbors. To cope with this an alternative method can be used.

Like in the inter RAT case neighbors are prepared and can be set to act as in the multi-RAT case described above. In accordance with one embodiment the neighbors of the cell being targeted for DTX are first informed that the cell is now going into DTX. As a result they are then not allowed to hand over users back to the cell going into DTX. An exception to this procedure can be set to when there are no other possibilities. In practice this means that a user (UE) must see the DTX cell as the only candidate for service—the alternative would be a radio link failure (RLF).

A DTX cell will ask the UEs currently in a border area of the cell to report neighbors to which they can be moved. The border area can be defined in as xdBs offset, where x is a pre-defined value. It can be beneficial but not necessary that the UEs within the border area are moved at the same time to minimize the interference, since they also after handover are coordinated by the same cell. The UEs found in the border area are then handed over. If there is no handover back during a period of time the cell will decrease a transmission signal such as the pilot signal (or similar) with the border area definition, i.e. by xdB or a value correlated to this value. By repeating this procedure step by step until a transmitted signal such as the pilot signal (or similar) reaches zero the cell is gradually put into DTX mode.

If there are one or more UEs that can not find a suitable neighbor but the only server is the current cell the DTX activation can be aborted and the cell may move back to normal operation.

In accordance with one exemplary embodiment if it is possible to use other mechanisms than RSRP or RSRP as for LTE for measuring the neighbors, where the signal is not interfered by own cell there is typically no need for ramping.

In future systems it is possible that the own cell will have the possibility to put the own reference signals in DTX mode. This means that a UE will be able to hear neighbors also in the inner cell during certain periods and thereby there is no need to gradually put the cell in DTX mode. Another possibility is to make use of other reference signals from the neighbors that are synchronized with the own cell (the reference signals will not be interfered by the own cell). Examples can be positioning signals not yet in the standard.

Since this makes it possible to have all UEs report neighbor candidates the DTX cell prepares the neighbors for the handover and executes the operation in a single step. If there are UEs not able to find neighbors the DTX activation is aborted.

Moving Idle Users

In accordance with one exemplary embodiment idle users are simply neglected and they are considered to be fully represented by active users. However, other possibilities exist.

In accordance with one embodiment the DTX cell informs the UEs that the cell will move to DTX verification via broadcast and stops transmitting. In response to such a broadcast message the idle UEs can be configured to either do a successful cell reselection or report that they have no other alternative but the cell going into DTX mode to camp on.

Having a possibility to report back (failing cell reselection) the UE is able to give information on the radio coverage it could obtain when the DTX cell was away. That can for example be the levels on which it can measure its candidate cells.

Aborting from DTX activation is a matter of operator policies and can be seen as a function over load in neighbors and the number of UEs losing coverage. A UE that loses the coverage partly under the loss but that gets coverage from another cell (i.e., can successfully perform cell reselection) will neglect the loss, i.e. there is no report of coverage loss sent to the DTX cell.

In accordance with another embodiment, the UE is configured to make a random access to the DTX cell when coverage is lost. The cell going into DTX mode can be configured to not answer but instead aggregate the number of attempts according to some predefined method (max, average, total etc) and when the value is over some threshold the DTX activation is aborted.

In addition the random access channel may be configured to a robust setting, involving setting the random access opportunity period to a smaller value and altering the format such that two repeated random access sequences are transmitted (doubling the received energy in the radio base station eNodeB). The UE, on the other hand, can use the last known path loss (it knows the wanted received power—which could have been changed for the DTX trial) and possible some power compensation so that it has good possibilities to be heard from the eNodeB. The number of attempts may also be 1–N where N may be given from the eNodeB or as a fixed value.

Another alternative is to completely stop transmission and reception in the cell and instead come back at full operation after a certain period. First at that time the UEs are able to report any failure in accordance with the above. The decision of whether the cell can be shut down may be based on, for example, the number of UEs reporting that they could not perform cell reselection. To avoid any new UEs trying to attach to the DTX at report time, it can be beneficial if the cell signals to active UEs that they are not allowed to attach (the cell will soon move to DTX).

If it is possible to change Tracking Area (TA), Routing Area (or similar) for the cell without taking the cell down, a number of TAs will be set aside for DTX activation. Before DTX activation the DTX verification cell is forced to change the TA. The consequence is that all idle UEs camping on the DTX cell will do a TA update and therefore all UEs attached can be registered.

As the DTX verification cell shuts down or step by step lowers its reference signal (and as such the best server area), some UEs will do cell reselection to neighboring cells and this will be noticed through TA updates. This gives the possibility to identify whether all idle UEs in the cell have successfully managed to perform cell reselection. When the DTX verification cell has been completely turned off then those UEs that were previously in the TA of the DTX verification cell (i.e., in the best server area) and which have not done cell reselection and, as such, TA update, can be assumed to have lost coverage. By counting the number of lost UEs, it can be decided whether the cell should be turned on again.

In yet another embodiment a UE is set to log when no cell selection can be made (no cell to camp on). For example the UE can be set to log the time with no coverage, latest camped cell etc. The cell is then put in DTX mode for a time period after which the cell is turned on and adapted to acquire reports from UEs having logged the performance when the cell is in DTX mode. Based on the logs the cell can be put in DTX mode (or not).

The different methods as described above can also be combined. In addition it is also possible to define different abortion criteria. The criteria can be set differently for (or by) different operators. The abortion criteria can for example be based on one or many of the following:

The number of users acceptable for losing coverage
The number of users in the surrounding cells
Quality for active and/or idle users
The load in the surrounding cells The examples above can then be expressed in relation to historic measurements, a derivate (how much a value can fluctuate), or absolute. The period under which steps are taken or the time a cell is away can also be changed depending on circumstances, such as number of users handled or measurement accuracy.

Whatever the outcome of DTX activation, the optimizer and coverage estimator is in accordance with one embodiment updated with the result so that it is possible to change the estimation processes using the result as input data. For example if a number of users face problems with coverage it is important that this information is fed into the coverage estimator 203 which based on such new data can decide to rebuild its data.

The logical entity DTX mode controller as described herein can be deployed in many ways. For example it can be implemented in a suitable radio node, like a radio base station (eNodeB), a radio network controller (RNC) etc. Also, the DTX mode controller can be implemented in a management system OSS/DM/NMS or the DTX mode controller can be implemented in a distributed manner in a combination of any such locations. This means that the information can be required to be transmitted between different nodes, possibly on an X2 interface in LTE implementation or to a central location on a management interface.

Using the methods and devices as described herein will help to reduce problems that an operator can experience when implementing an automated DTX mode function for cells in a radio network. Using the methods and devices as described herein will make it possible to counter the problems that can occur as a result of underestimation of coverage or load in remaining cells, used when taking a cell into DTX. This is made possible by providing means for observing and counteracting before the network and users face capacity or coverage malfunction when automatically bringing a cell (site) into DTX mode.

The invention claimed is:

1. An automated method of bringing a cell in a cellular radio network into DTX mode comprising:
   determining coverage requirements of a geographical area covered by the cellular radio network,
   selecting a cell in the cellular radio network to bring into DTX mode,
   moving the cell into DTX mode,
   verifying during a non-zero time period an outcome of the moving of the cell into DTX mode, and
   determining if the cell is to remain in DTX mode or if the cell is to return to a transmission mode based on the outcome during the non-zero time period, wherein the cell is returned to the transmission mode when one of the following occurs:
      if a predetermined number of active user equipments of the cell have not moved to another cell during the non-zero time period; or
      if a predetermined number of idle user equipments of the cell have not made a cell reselection during the non-zero time period; or
      if during the non-zero time period a neighboring cell of the cell experiences a load above a predetermined threshold.

2. The method according to claim 1, wherein information received from user equipments is used for determining if the cell is to remain in DTX mode or if the cell is to return to a transmission mode based on the information during the non-zero time period.

3. The method according to claim 1, wherein neighbor cells are informed that the cell is selected to be brought into DTX mode.

4. The method according to claim 1, wherein during the non-zero time period the strength of a transmission signal of the cell is reduced in iterative steps.

5. The method according to claim 4, wherein the transmission signal is a pilot signal.

6. The method according to claim 1, further comprising reporting an event where the cell selected to be brought into DTX mode is determined to be returned to the transmission mode based on observations during the non-zero time period to at least one other entity of the cellular radio network.

7. The method according to claim 6, wherein the at least one other entity is one of a domain manager and a calculation unit.

8. A device for bringing a cell in a cellular radio network into DTX mode, the device configured to:
- determine coverage requirements of a geographical area covered by the cellular radio network,
- select at least one cell in the cellular radio network to bring into DTX mode,
- move the at least one cell into DTX mode,
- verify during a non-zero time period the outcome of the moving of the at least one cell into DTX mode, and
- determine if a particular cell of the at least one cell is to remain in DTX mode or if the particular cell is to return to a transmission mode based on the outcome during the non-zero time period, wherein the device is configured to return the particular cell to a transmission mode:
  - if a predetermined number of active User Equipments of the particular cell have not moved to another cell during the non-zero time period; or
  - if a predetermined number of idle User Equipments of the particular cell have not made a cell reselection during the non-zero time period; or
  - if during the non-zero time period a neighboring cell of the particular cell experiences a load above a predetermined threshold.

9. The device according to claim 8, wherein the device is configured to use information received from user equipments for determining if the particular cell of the at least one cell is to remain in DTX mode or if the particular cell is to return to a transmission mode based on the information during the non-zero time period.

10. The device according to claim 8, wherein the device is configured to inform neighbor cells that a cell is selected to be brought into DTX mode.

11. The device according to claim 8, wherein the device is configured to reduce the strength of a transmission signal of the cell in iterative steps during the non-zero time period.

12. The device according to claim 11, wherein the transmission signal is a pilot signal.

13. The device according to claim 8, wherein the device is further configured to report an event where a cell selected to be brought into DTX mode is determined to be returned to a transmission mode based on the observations during the non-zero time period to at least one other entity of the cellular radio network.

14. The device according to claim 13, wherein the at least one other entity is one of a domain manager and a calculation unit.

\* \* \* \* \*